United States Patent
Lopez et al.

(10) Patent No.: US 7,103,876 B1
(45) Date of Patent: Sep. 5, 2006

(54) SYSTEM AND METHOD FOR ANALYZING EXECUTING COMPUTER APPLICATIONS IN REAL-TIME

(75) Inventors: Mauricio Lopez, Atlanta, GA (US); Mark Kirkpatrick, Conyers, GA (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 618 days.

(21) Appl. No.: 10/025,932

(22) Filed: Dec. 26, 2001

(51) Int. Cl.
*G06F 9/44* (2006.01)

(52) U.S. Cl. .................. 717/127; 717/108; 717/117; 717/129

(58) Field of Classification Search ................ 717/130, 717/148, 124–129, 100, 157, 117, 108; 709/203, 709/224; 707/10, 103 Y; 705/52, 34; 714/39; 713/200

See application file for complete search history.

(56) References Cited

U.S. PATENT DOCUMENTS

| | | | |
|---|---|---|---|
| 6,202,200 B1 * | 3/2001 | House et al. ................ 717/100 |
| 6,467,052 B1 * | 10/2002 | Kaler et al. ................... 714/39 |
| 6,493,680 B1 * | 12/2002 | Logan et al. ................. 705/34 |
| 6,647,544 B1 * | 11/2003 | Ryman et al. ............... 717/127 |
| 6,654,949 B1 * | 11/2003 | Fraenkel et al. ............ 717/130 |
| 6,662,363 B1 | 12/2003 | Miyamoto |
| 6,671,830 B1 * | 12/2003 | Kaler et al. ................... 714/39 |
| 6,671,876 B1 * | 12/2003 | Podowski ................... 717/130 |
| 6,681,389 B1 | 1/2004 | Engel |
| 6,687,702 B1 * | 2/2004 | Vaitheeswaran et al. ...... 707/10 |
| 6,698,013 B1 * | 2/2004 | Bertero et al. .............. 717/127 |
| 6,857,120 B1 * | 2/2005 | Arnold et al. ............... 717/157 |
| 6,865,580 B1 * | 3/2005 | Bush ....................... 707/103 Y |
| 7,017,151 B1 * | 3/2006 | Lopez et al. ................ 717/127 |
| 7,028,291 B1 * | 4/2006 | Sumida et al. .............. 717/128 |
| 2001/0054026 A1 * | 12/2001 | Choate ......................... 705/52 |
| 2002/0046273 A1 * | 4/2002 | Lahr et al. ................... 709/224 |
| 2002/0056076 A1 * | 5/2002 | Made .......................... 717/129 |
| 2002/0087949 A1 * | 7/2002 | Golender et al. ........... 717/124 |
| 2002/0129337 A1 * | 9/2002 | Evans et al. ................ 717/124 |
| 2002/0174174 A1 * | 11/2002 | Ramraj et al. .............. 709/203 |
| 2003/0028862 A1 * | 2/2003 | Bates et al. ................. 717/129 |
| 2003/0066059 A1 * | 4/2003 | Moon et al. ................. 717/148 |
| 2004/0015839 A1 * | 1/2004 | Sarkar et al. ............... 717/108 |
| 2004/0107415 A1 * | 6/2004 | Melamed et al. ........... 717/124 |
| 2004/0123136 A1 * | 6/2004 | Jung .......................... 713/200 |
| 2004/0205704 A1 * | 10/2004 | Miller et al. ................ 717/109 |
| 2005/0039172 A1 * | 2/2005 | Rees et al. .................. 717/130 |

OTHER PUBLICATIONS

Xiaoping et al., A generic approach of static analysis for detecting runtime errors in Java programs, Oct. 27-29, 1999, IEEE, pp. 67-72.*

Al-Theyeyan et al., XML-based visual specification of multidisciplinary applications, May 15-18, 2001, IEEE, pp. 414-421.*

Dasgupta, A Probe-Base Monitoring Scheme for an Object-Oriented, Distributed Operating System, OOPSLA, Sep. 1986, pp. 57-66.*

(Continued)

*Primary Examiner*—Wei Zhen
*Assistant Examiner*—Satish S. Rampuria
(74) *Attorney, Agent, or Firm*—Withers & Keys, LLC

(57) ABSTRACT

An object shell console attaches to an executing computer application. The object shell console extracts information from the executing application without interrupting or terminating the executing application. The information is displayed to a user on a graphical user interface. The user can choose to have more detailed information about the executing application displayed by request, if such information exists.

13 Claims, 2 Drawing Sheets

OTHER PUBLICATIONS

Haban et al., Application of real-time monitoring to scheduling tasks with random execution times, IEEE, vol. 16 Issue: 12 Dec. 1990, pp. 1374-1389.*

Nilsen et al., The real-time behavior of dynamic memory management in C++, IEEE, May 1995, pp. 142-153.*

Farber et al., Improving processor utilization with a task classification model based application specific hard real-time architecture, IEEE, Oct. 1997, pp. 276-283.*

Kim et al., Issues in realization of an execution time analyzer for distributed real-time objects, IEEE, Mar. 2000, pp. 171-178.*

U.S. Appl. No. 10/025,774, Lopez.

Narasimhan, N. et al., "Interception in the Aroma System", Dept. Electrial and Computer Engineering, University of Ca, 2000, p. 107-115.

Chuang, Tyng-Ruey et al., "Non-Intrusive Object Introspection In C++: Architecture and Applications", Institute of Information Science, 1998, p. 312-321.

http://web.archive.org/web/20010630005237/http://www.edm2.com/0601/rmil.html, Introduction to Java Remote Method Invocation (RMI) by Chris Matthews, Jun. 30, 2001.

http://my.execpc.com/-gopalan/java/java__rmi.html, "Java Remote Method Inovocation" by Gopalan Suresh Raj, Jul. 6, 1998.

"JAVA in a Nutshell" by David Flanagan, 1997 O'Reilly & Associates, Inc.

Cross-Debugging Real-Time ADA Programs, G. Burns, Verdix Corp., © 1987.

* cited by examiner

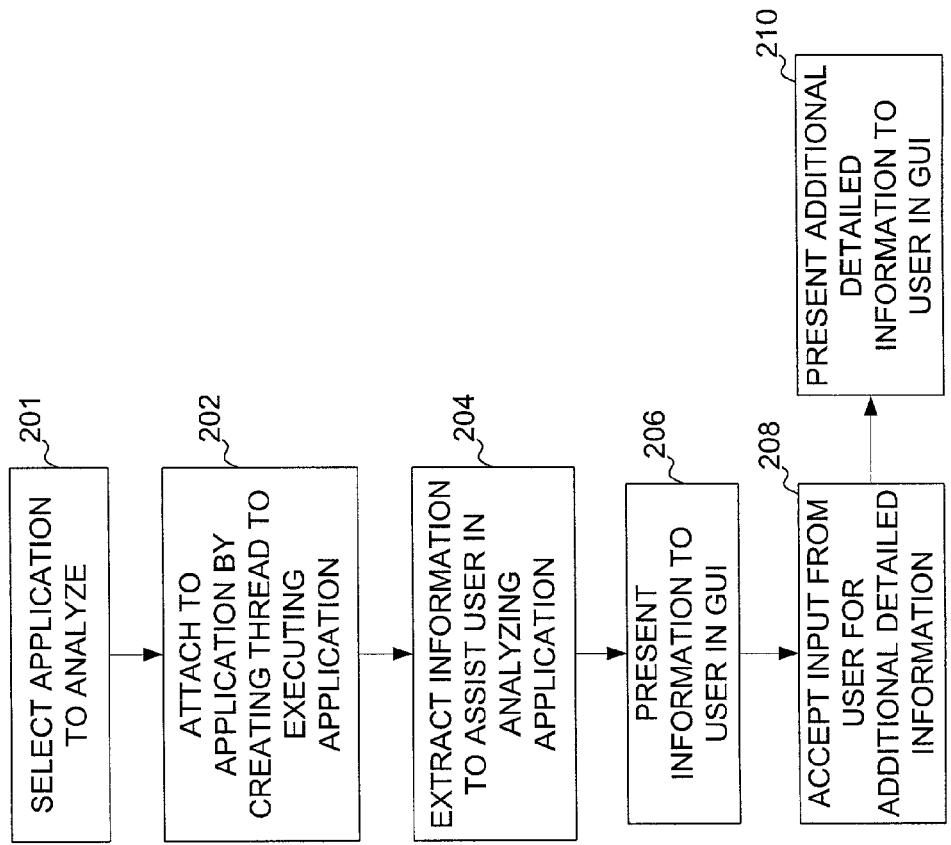

SYSTEM AND METHOD FOR ANALYZING EXECUTING COMPUTER APPLICATIONS IN REAL-TIME

BACKGROUND

1. Field of the Invention

The present invention relates generally to the field of diagnostic tools for computer software. More specifically, the present invention relates to real-time analysis of a computer application while it is executing without terminating or interrupting the application's execution.

2. Background of the Invention

Web-based software applications often execute on application server platforms. Examples of such application server platforms include systems such as iPlanet or Weblogic. Due to their nature, it is desirable to keep web-based applications highly available. Thus, minimizing their downtime is a critical goal. However, this goal can pose significant problems in the trouble-shooting and maintenance environment of most IT facilities. Downtime is often required to diagnose and correct software errors or to upgrade systems. Downtime to maintain systems or find and repair errors can have enormous impacts on IT facilities' operations and viability.

Conventional debugging tools do not adequately solve the problem of analyzing an application during its normal unimpeded execution. These tools are generally limited to assisting users in locating software errors in the logic of written computer software. When used, these tools do not allow analysis of the computer software operating in its normal mode of operation. Rather, the operation of the software is controlled by the debugging tool. Thus, the debugging tool interferes with and/or interrupts the natural execution of the software. An immediate difficulty with using such tools is diagnosing performance problems. This is because performance problems generally arise from the effect of external system dynamics acting software during its normal operation, rather than from erroneous computer software. Because conventional debugging tools interfere with an application's natural operation, they do not provide insight into what problems are giving rise to performance-related issues. Thus, conventional debugging tools tend to be of little value for addressing performance-related problems. Consequently, there is a need for a computer software diagnostic tool that can provide users with information to analyze executing web-based applications without terminating or seriously impeding their normal operation.

SUMMARY OF THE INVENTION

The present invention solves the foregoing problems in the art by providing a user with an interface that allows the user to analyze web-based applications while they are executing. The analysis is performed without interrupting or terminating the application being analyzed. By providing insight into the operation of an executing application, the present invention allows the user to analyze and understand causes of performance issues and/or determine the source of errors that may be present in the applications.

Preferably, an object shell console is used to connect to an executing application. The object shell console extracts software components from the executing application and displays these to the user. For example, the object shell console can obtain and display information regarding the classes and methods comprising a particular application, the value of the variables used in those methods, the execution time of methods, the number of times that an instance of a particular method or class is invoked, and other data that is useful in analyzing performance of an executing application.

In one embodiment, the present invention is a system for analyzing a computer application while it is executing without terminating or interrupting the application. An application to be analyzed executes on a computer such as an application server. An object shell console executing on an administration client attaches to an application to be analyzed that is in execution so that it can extract information from the application without interrupting the application or causing the application to terminate. The information is presented to a user in a graphical user interface presented by the object shell console. The user can also obtain more detailed information about the application that is being analyzed.

In another embodiment, the present invention is a method for analyzing a computer application while it is executing. The method includes the steps of connecting to the computer application and extracting information from the computer application without interrupting or terminating the computer application. The method also includes the step of displaying the information to a user in a graphical user interface. In addition, more detailed information can be provided to the user if such information exists.

BRIEF DESCRIPTION OF THE DRAWINGS

FIG. 2 is a flow chart illustrating a method for analyzing computer applications according to an embodiment of the present invention.

DETAILED DESCRIPTION OF THE INVENTION

Figure 1:
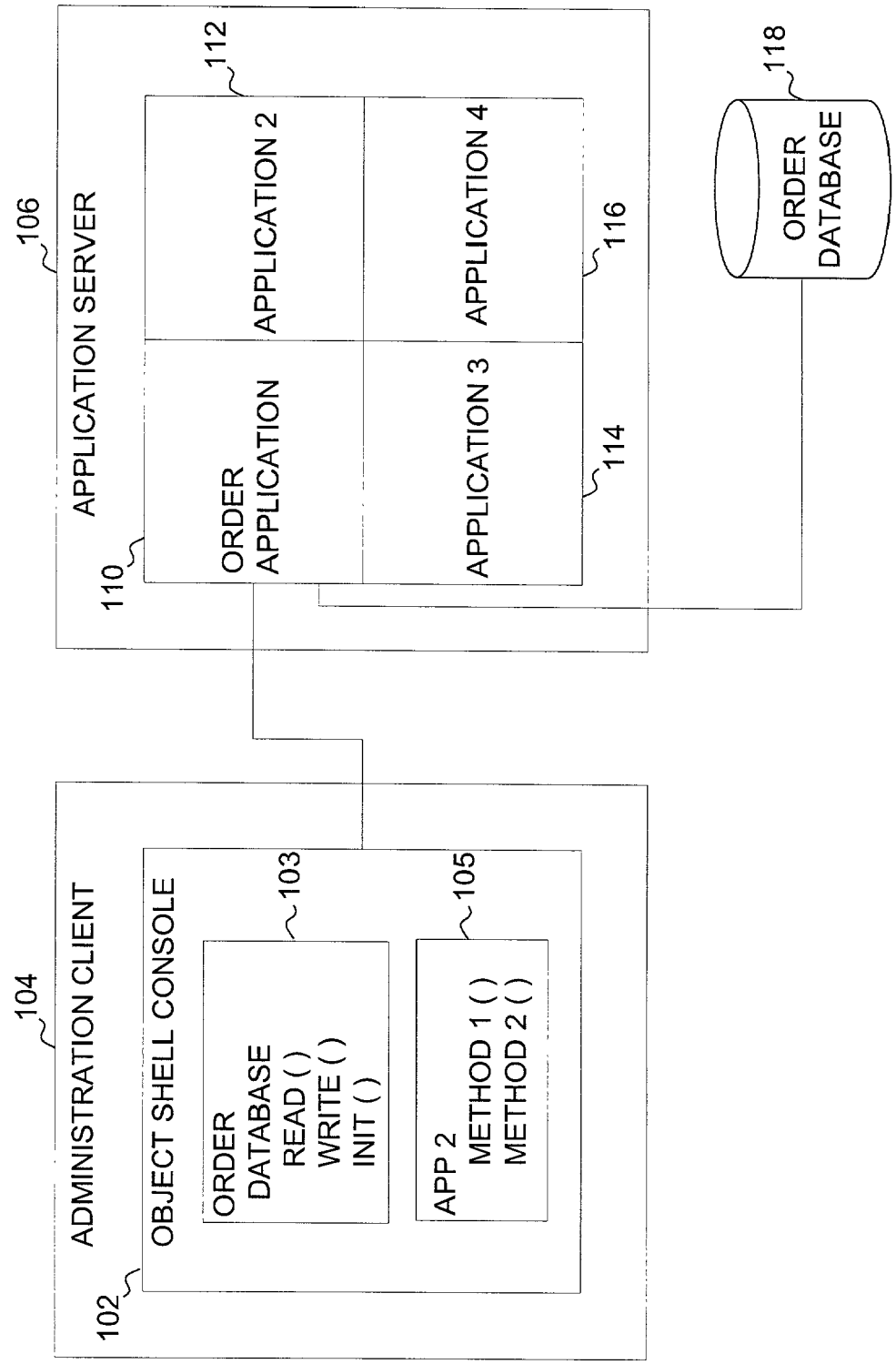
FIG. 1 is a schematic diagram a system for analyzing computer applications according to an embodiment of the present invention.

The cause of many performance-related problems in web-based applications is often not immediately apparent. This is because, the problem is not with the software itself, but with a change to the system that occurs due to the dynamic nature of web-based systems. Consequently, the problem cannot be analyzed using conventional diagnostic tools because such tools do not allow the application being analyzed to run without interruption. Furthermore, it is likely that the performance-related problem may not be revealed when the application is executed in this manner. Without the present invention, this kind of error could be extremely difficult to detect.

FIG. 1 is a schematic diagram of a system for analyzing computer applications according to an embodiment of the present invention. An object shell console 102 executes on an administration client 104. Administration client 104 can be any computer that can execute an object shell console 102 having the functionality described herein. Object shell console 102 attaches to an application executing on an application server 106 so that the application can be analyzed. Importantly, the connection does not interrupt or terminate the application to be analyzed.

Exemplary applications 110, 112, 114 and 116 are illustrated executing on an application server 106. One application, for example, is an order application 110. Order application 110 helps handle orders from customers. To support its function, order application 110 is coupled to an order database 118. Order database 118 contains order information required to support order application 110. For example, order database 118 contains inventory data, supplier data and customer data.

In an embodiment of the present invention, object shell console 102 uses attributes of an interpreter programming language, such as the JAVA programming language, to connect to an application that is to be analyzed without terminating the application. Once connected, object shell console 102 can provide information to a user to analyze the executing application without terminating or impeding the executing application. Object shell console 102 can provide this capability by connecting to the JAVA programming language virtual machine (JVM) on which the application to be analyzed is executing.

One exemplary way for making this connection is to use JAVA programming language remote method invocation (RMI). JAVA programming language RMI is a well-known tool that can be used to access one JVM from another JVM. Using JAVA programming language RMI allows remote invocation and execution of applications and methods. To invoke a remote application (or method), JAVA programming language RMI creates a thread to the other application or method. Creation of the new thread using JAVA programming language RMI occurs without interrupting or terminating the executing application. Thus, the application to which the connection is made continues to execute normally.

The application that is connected to and invoked can be either local or remote to administration client 104. Once the connection is established, object shell console 102 has access to the internal structure of the invoked application. This access is allowed by a feature of the Java programming known as introspection. Introspection was developed for JAVA programming language Beans to allow for integrated development environments (IDEs) to visually manipulate graphical components to build applications. The classes that are used for introspection are Class, Method and Field. These classes are also the components of an object. When object shell console 102 retains a reference to a running object by creating the thread, these classes are used to extract the fields and execute the methods of the object. The fields of the object can be manipulated to create different behaviors in the object. Methods can be re-executed with argument values supplied by an operator or system administrator. The values returned by the method's execution can be displayed for analysis.

Object shell console 102 gains this access without terminating or interrupting the invoked application. Thus, once connected, object shell console 102 can determine classes and methods that are present in the invoked application without terminating or interrupting the invoked application.

After the thread to the application is created, the application can be analyzed. One kind of data in the application that is accessible to object shell console 102 via the new thread is the set of methods that comprise the application. Using this information, object shell console 102 can present a list of methods that are running in the application to a user of the present invention. Preferably, the methods are listed hierarchically. Primary categories of methods and/or classes are listed. Subcategories of the primary categories allow for more detailed analysis. For example, one or more of the classes comprising the application can be listed. Under each class, methods comprising the class can be listed. Referring to FIG. 1, for example, order application has a database class. Database class has read( ), write( ) and init( )methods.

In addition, object shell console 102 allows a user to examine the operation of an application or method. To assist the user, object shell console 102 can display any information about the executing application or method. The information that is displayed can be selected by the user, preconfigured or a combination of user-selected and preconfigured information. For example, object shell console 102 can display a list of variables by name and/or value available for a method in a class. In addition, object shell console 102 can display a list of arguments by name and/or value that are passed to or from a method or used by a class. Further, object shell console 102 can display the computer code of the application, or any method or class in the application.

Moreover, object shell console 102 can provide other information regarding the objects, classes or methods comprising an application. For example, object console 102 can display the number of times the method is invoked. An unexpectedly large number of invocations of a particular method indicates the presence of a possible loop condition. Further, object shell console 102 can display the execution time of a particular method. A large value of this time might indicate a particular performance problem that needs to be addressed. For example, an unusually long database write time might indicate problems with database 118, or that there are external influences that need to be checked that might be affecting its behavior.

After extracting the information, object shell console 102 formats the information so that it can be displayed in a graphical user interface (GUI). For example, object shell console 102 presents a list of all the classes and methods that are available within order application 110 to the user.

The user can obtain more detailed information from the information displayed on the GUI. For example, the user can select a displayed method name to select a particular method, and request more detailed information corresponding to that method. Information, including the name and value of variables used in the method, the name and value of arguments passed to or from the method, the number of times the method is invoked and execution time of the method. Further, any methods comprising the selected method can be shown to the user.

An example will help to clarify the present invention. Assume there is an indication of a performance problem with order database 118. Such indications include errors in error logs corresponding to order database 118 and complaints by users of order database 118. Using object shell console 102, a user of the present invention attaches to order application 110. As described above, this attachment is preferably achieved through creation of a new thread for the application using JAVA programming language RMI. The new thread gives object shell console 102 access to the internal structure of order application 10.

Once attached to order application 110, object shell console 102 extracts information from the newly created thread such as classes and methods comprising order application 110. As described above, this information is presented to the user in the GUI of object shell console 102. In the present example, order application 110 includes a database class. The database class is comprised of 3 methods, read( ), write( ) and init( ). The application name, class name and methods are displayed to the user in object shell console 112's GUI.

FIG. 2 is a method for analyzing an executing computer application without termination or interruption of the executing application according to the present invention. The method can be executed by an administration client as described above. In step 201, a user selects an application for analysis. In step 202, the present invention attaches to an application to be analyzed. As described above, this connection can be made by creating a thread to the executing application. In one embodiment of the present invention, JAVA programming language RMI is used to create the thread.

In step 204, information related to the executed application is extracted using the created thread. This information can include any information that a user can use to analyze the executing application. For example, the information can include methods and classes comprising the executing application. Further the information can include variable names, variable values, argument names, argument values, execution time, number of time a method is invoked and other information about the executing application.

In step 206, the information is presented to the user. Preferably, the information is formatted for presentation in a graphical user interface (GUI). In one embodiment of the present invention, the information is presented to the user in a hierarchical fashion. For example, classes comprising the application are listed. under each method, any methods in the class are listed. This hierarchy can continue for as many levels as are required to present the information to the user.

In step 208, addition detailed information can be extracted from the application if the user requests it. For example, the user may desire more information about a particular method. The user can double click the method name to obtain information about variable and/or argument names and/or values. The information is obtained in response to this request and displayed to the user in step 210. Preferably, the additional detailed information is displayed on the GUI.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A system for analyzing a computer application while it is executing without terminating or interrupting the application, comprising:
   an application that is executing to be analyzed;
   an administration client;
   an object shell console executing on the administration client, the object shell console connected to the application so that it can extract information from the application that defines at least the basic internal structure of the application including at least one object component without interrupting the application or causing the application to terminate, wherein the at least one object component includes a set of methods of an object currently executing within the application and wherein each method of the set includes a list of variables and corresponding values available for the method and a list of arguments and corresponding values passed to or from each method; and
   a graphical user interface presented by the object shell console for presenting at least a portion of the extracted information that defines the internal structure to the user and allowing the user to obtain additional detailed information regarding the internal structure including values associated with the at least one object component, wherein the graphical user interface displays the set of methods, receives a selection of one of the methods, displays the list of variables available for the selected method, and displays the list of arguments being passed to or from the selected method, wherein the graphical user interface receives user input specifying an argument value for one of the displayed arguments, and wherein the object shell console passes the argument value for the displayed argument to the selected method within the application, causes the application to re-execute the method with the argument value, and extracts an updated list of variable values and argument values upon the method re-executing to display the updated list of variable values and argument values.

2. The system recited in claim 1, wherein the object shell console determines a number of times a selected method is invoked.

3. The system recited in claim 1, wherein the object shell console determines a length of time required for a selected method to execute.

4. The system recited in claim 1, wherein the thread is created using JAVA programming language RMI.

5. A method for analyzing a computer application while it is executing, comprising the steps of:
   connecting an object shell console to an executing computer application;
   extracting information defining the internal structure of the application and including at least one object component from the computer application without interrupting or terminating the computer application, wherein the at least one object component includes a set of methods of an object currently executing within the application and wherein each method of the set includes a list of variables and corresponding values available for the method and a list of arguments and corresponding values passed to or from each method; and
   displaying the information to a user in a graphical user interface component, wherein the graphical user interface displays the set of methods, receives a selection of one of the methods, displays the list of variables available for the selected method, and displays the list of arguments being passed to or from the selected method, wherein the graphical user interface receives user input specifying an argument value for one of the displayed arguments, and wherein the object shell console passes the argument value for the displayed argument to the selected method within the application, causes the application to re-execute the method with the argument value, and extracts an updated list of variable values and argument values upon the method re-executing to display the updated list of variable values and argument values.

6. The method recited in claim 5, wherein the extracting step comprises the step of extracting one or more of a number of times a selected method is invoked, an execution time of a selected method and a class.

7. The method recited in claim 5, further comprising the step of displaying the information according to a hierarchy.

8. The method recited in claim 7, further comprising the steps of:
displaying at least one class in the graphical user interface; and
displaying at least one method corresponding to at least one of the at least one classes.

9. The method recited in claim 5, further comprising the steps of:
accepting a request from the user for more detailed information about the at least one object component including a value associated with the object component;
obtaining the more detailed information including the value associated with the object component in response to the user's request; and
displaying the more detailed information including the value associated with the object component to the user in the graphical user interface.

10. A system for analyzing a computer application while it is executing, comprising:
a computer application executing on an application server;
a thread for connecting an object shell console to the computer application;
means for extracting information that defines the internal structure of the computer application including at least one object component without interrupting or terminating the computer application, wherein the at least one object component includes a set of methods of an object currently executing within the application and wherein each method of the set includes a list of variables and corresponding values available for the method and a list of arguments and corresponding values passed to or from each method;
means for displaying the extracted information including the at least one object component to a user in a graphical user interface;
means for accepting a request from the user for additional detailed information including a value associated with the object component, wherein the graphical user interface displays the set of methods and wherein the request is a selection of one of the methods;
means for providing the additional detailed information including the value associated with the object component to the user in the graphical user interface, wherein the means for providing displays the list of variables available for the selected method, and displays the list of arguments being passed to or from the selected method means for receiving user input specifying an argument value for one of the displayed arguments;
means for passing the argument value for the displayed argument to the selected method within the application to cause the application to re-execute the method with the argument value; and
means for extracting an updated list of variable values and argument values upon the method re-executing so that the means for providing displays the updated list of variable values and argument values.

11. The system recited in claim 10, further comprising means for determining an execution time of a selected method.

12. The system recited in claim 10, further comprising means for determining a number of times a selected method is executed.

13. The system recited in claim 10, further comprising means for presenting the information in a hierarchical fashion.

\* \* \* \* \*